United States Patent [19]
Tregidgo et al.

[11] Patent Number: 5,435,346
[45] Date of Patent: Jul. 25, 1995

[54] DEVICE FOR TREATING AND CONDITIONING ENGINE COOLANT

[75] Inventors: John Tregidgo, Hewitt; Francis J. Regina, Millburn; Arthur T. Walsh, Morris Plains; Ronald P. Rohrbach, Flemington; Thirumalai G. Palanisamy, Morristown, all of N.J.; Gordon W. Jones, Toledo; Gilbert C. Reynolds, Oak Harbor, both of Ohio

[73] Assignee: AlliedSignal Inc., Morristown, N.J.

[21] Appl. No.: 196,051

[22] Filed: Feb. 14, 1994

[51] Int. Cl.⁶ .............................................. F28F 19/00
[52] U.S. Cl. .................................. 137/564.5; 165/119; 165/134.1; 123/41.15; 210/167; 210/205; 210/DIG. 17
[58] Field of Search ............... 137/564.5; 165/12, 119, 165/134.1; 210/167, 198.1, 205, 251, DIG. 17; 123/41.15

[56] References Cited

U.S. PATENT DOCUMENTS

| | | | |
|---|---|---|---|
| 3,200,840 | 8/1965 | Watts | 137/564.5 |
| 3,410,305 | 11/1968 | Hicks, Jr. | 137/564.5 |
| 3,809,150 | 5/1974 | Holmes | 165/134.1 X |
| 4,333,516 | 6/1982 | Krueger et al. | 165/134.1 X |
| 4,338,959 | 7/1982 | Krueger et al. | 123/41.15 X |
| 4,338,997 | 7/1982 | Krueger et al. | 165/134.1 |
| 4,347,895 | 9/1982 | Zambrow | 165/134.1 |
| 4,357,236 | 11/1982 | Krueger | 165/134.1 |
| 4,379,052 | 4/1983 | Stearns | 123/41.15 X |
| 4,402,912 | 9/1983 | Krueger et al. | 123/41.15 X |
| 4,782,891 | 11/1988 | Cheadle et al. | 165/134.1 |
| 5,024,268 | 6/1991 | Cheadle et al. | 165/134.1 |

*Primary Examiner*—John Rivell
*Attorney, Agent, or Firm*—Ken C. Decker; Leo H. McCormick, Jr.

[57] ABSTRACT

A device for treating and conditioning engine coolant for use with an internal combustion engine includes a housing having an inlet and outlet and a filtering media and container carrying coolant treatment material located within the housing. Coolant passes through the filter, and then is exposed to the tip of a rod which erodes away to permit treatment material to be discharged in the coolant. As the corrosiveness of the coolant decreases, erosion of the rod is discontinued, so that additional treatment material is no longer discharged into the coolant. Accordingly, the corrosiveness of the coolant is controlled to within relatively narrow limits.

21 Claims, 1 Drawing Sheet

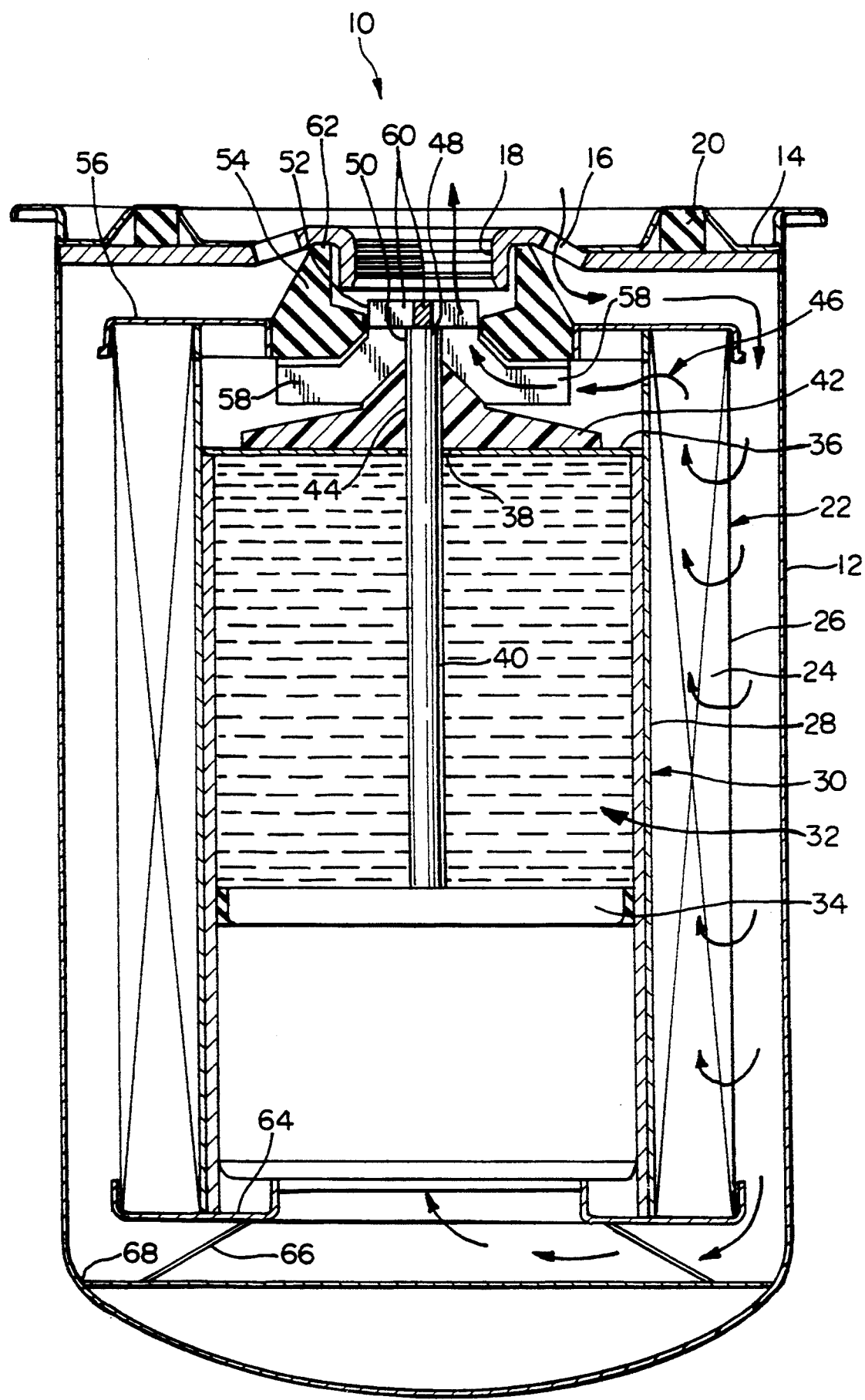

DEVICE FOR TREATING AND CONDITIONING ENGINE COOLANT

This invention relates to a device for dispensing supplemental coolant additives into the engine coolant of a motor vehicle to maintain the proper amount of corrosion inhibitors in the coolant during engine operation.

It is important that internal combustion engines, particularly diesel engines used on heavy duty vehicles, be provided with an engine coolant that contains a proper amount of corrosion inhibitors and buffering agents. If the coolant is provided with either too high or too low a concentration of corrosion inhibitors, damage to the engine may result. Accordingly, since it is often impractical to change the engine coolant often enough to assure the proper concentration of corrosion inhibitors, it has been customary to provide coolant treatment devices that both filter the coolant and dispense buffers and corrosion inhibitors into the coolant when the concentration of corrosion inhibitors drops below the required level necessary to maintain proper corrosion protection. A typical prior art device for dispensing such treatment material into the engine coolant is disclosed in U.S. Pat. No. 4,782,891. The device disclosed in this patent provides a series of containers containing a corrosion inhibitor which are separated from the coolant flow path by a membrane which disintegrates when the corrosivity of the coolant exceeds a predetermined level. When the membrane for each container erodes, the entire contents of the container are dumped into the coolant. Accordingly, immediately after the membrane erodes, the level of inhibitors in the coolant is too high, but the level may drop to a level less than that necessary to provide proper protection before the membrane separating the coolant from the succeeding container is ruptured. Accordingly, for the bulk of the engine run time, the level of inhibitors in the coolant is either too high or too low and, as discussed above, either too high or too low a concentration of inhibitors is detrimental to engine performance.

The present invention provides a device effecting a regulated discharge of coolant additive to maintain the level of inhibitors in the coolant within a relatively narrow range. In the present invention, a quantity of treatment material (in paste or liquid form) is contained in a container separated from the flow path of the coolant. The additives are discharged from the container by a piston. A metering column or rod prevents movement of the piston, but the rod is exposed to the coolant and is responsive to the corrosivity of the liquid to slowly erode it away, thereby permitting the piston to discharge treatment material into the coolant. Accordingly, small amounts of treatment material are discharged into the flow stream as necessary, thereby maintaining the level of inhibitors at the proper level. As used herein, references to "corrosion" of the metering rod also refers to erosion or dissolution of the metering rod due to the corrosive effect of the engine coolant.

These and other advantages of the present invention will become apparent from the following description, with reference to the accompanying drawing, the sole FIGURE of which is a cross-sectional view of a coolant treatment device made according to the teachings of the present invention.

Referring now to the drawing, a coolant treatment device generally indicated by the numeral 10 includes a cup-shaped housing member 12 having an open end which is closed by a bottom plate assembly 14 which is attached to the housing 12 in a conventional manner, such as by crimping. The bottom plate 14 is provided with circumferentially spaced inlet openings 16 which circumscribe an outlet opening 18 which is coaxial with the housing 12. The outlet opening 18 is threaded for "spin-on" attachment to a standard mounting stud (not shown) provided on a mounting base for the device in the engine cooling system. The bottom plate assembly 14 further includes a circumferentially extending gasket 20 which is adapted to sealingly engage the aforementioned mounting surface to provide a fluid tight connection between the mounting surface and the device 10.

A filtering media generally indicated by the numeral 22 consists of a circumferentially extending array of pleated filter paper generally indicated by the numeral 24. The individual pleats of the array 24 taper from their outer tips 26 to their inner tips 28. A circumferentially extending center tube 30 circumscribes the inner tips 28 of the pleated array 24 and defines the outer circumferential wall of a coolant additive container 32. A piston 34 is slidably and sealingly engaged with the inner circumferential surface of the centertube 30 and defines one transverse wall of the container 32. The opposite transverse wall of container 32 is defined by end disc 36. End disc 36 is provided with an enlarged aperture 38 through which a metering rod 40 extends. The aperture 30 receives metering rod 40 with a substantial clearance sufficient to permit the contents of the container 32 to be discharged through the aperture 38 around the metering rod 40. As discussed above, the container 32 contains coolant treatment and corrosion inhibiting chemicals, preferably carried in paste or liquid form. A circumferentially extending, flexible umbrella valve 42 projects radially from the metering rod 40 and engages the end disc 36. Umbrella valve 42 is provided with a central aperture 44 which receives the metering rod 40 with a sliding friction fit. As will be discussed later. The metering rod 40 erodes away and slips within the umbrella valve 42. Accordingly, umbrella valve 42 serves as a check valve element that permits discharge of the contents of the container 32 through the aperture 38, but prevents entry of coolant into the container 32, thus maintaining the contents of the container 32 isolated from the flow path of the coolant through the filter. The umbrella valve 42 also protects the rod 40 from the coolant communicating through the flow path generally Indicated by the numeral 46 between the media 22 and the outlet opening 18. Accordingly, only the tip of 48 of the rod 40 is exposed to coolant in flow path 46. The tip 48 is received in a cavity 50 within a stop member 52 that is mounted between the umbrella valve 42 and a gasket 54 carried on filter end disc 56. The stop member 52 defines a passage 58 that forms a part of the flow path 46. Cross members 60 at substantially right angles to one another engage the end of the rod 40 while still providing openings to allow flow through the stop member 52 through the passages 58. The gasket 54 includes an axially projecting, circumferentially extending portion 62 which engages the bottom plate 14 at a circumferentially extending engagement area circumscribing the outlet opening 18 and located between the outlet opening 18 and the circumferentially spaced inlet openings 16, to thereby seal the outlet 18 from the inlet openings 16. A end disc 64 closes the ends of the pleats 24 at the end opposite that closed by the end disc 56, and a spring retainer 66 engages the end disc 64 and engagement 68 at the end of the housing 12 to thereby provide a spring biasing force loading the portion 62 of the gasket 54 into sealing engagement with the engagement surface on the bottom plate 14.

The rod 40 consists of a Mg/Zn alloy containing 48% magnesium and 52% zinc by weight. The alloy is fabricated by weighing the metals in the proper ratio, heating them in an argon atmosphere until completely molten, and holding at the temperature for about twenty minutes, stirring the molten mixture often. It is then poured into a die to make a rectangular or cylindrical mass. Cylindrical rods of the required dimensions are machined from the mass after it cools down to room temperature. Accordingly, a corrosive couple is set up between the magnesium and zinc domains within the rod when it is exposed to coolant.

The choice of metal or alloyed metal for the corrodible rod material is made based on its preferential corrosion rate for a particular anticorrosion inhibitor level. The metal or alloy must corrode at the appropriate rate for the particular state of the anticorrosion inhibitor level. The mechanisms of corrosion which can be used to obtain this desired effect can result from alloying of the proper metals to generate internal galvanic action or to rely on the external galvanic action set up between the corrodible rod and the stop member 52. A number of different metals and alloys are effective for this purpose. However, an alloy comprising magnesium with varying amounts of zinc is the most preferred composition. However, many other variations exist with other metal compositions and this invention is not limited to this particular embodiment.

As discussed above, The additives contained within the chamber 32 may be either a liquid or paste form. If necessary, the liquid additives may be kept separated in flexible bladders which partition off the chamber 32. It is necessary to separate these solutions into these "baggies" type bladders because some of the required treatment solutions are incompatible with the others. Whether in paste or liquid form, the additives within chamber 32 consists of a pH buffering agent (such as either sodium or potassium phosphate or sodium borate), a general anti-corrosion inhibitor (such as sodium nitrate), an anti-cavitation agent (sodium nitrite based), aluminum and solder corrosion inhibitors (such as sodium silicate), and organic corrosion inhibitors (for copper, brass and solder, such as a triazole derivative). A typical formulation (based on dry weight percent) is: buffer 38–48%, corrosion inhibitor 12–16%, anti-cavitation agent 10–16%, aluminum solder corrosion inhibitor 5–16%, organic corrosion inhibitors 10–15%, and miscellaneous additives 2–5%.

In operation, coolant enters the inlet opening 16 and completely fills the housing 12. A pressure drop occurs as the coolant passes through the media 12, and thus the pressure at the outlet is less than the pressure at the inlet, a pressure biasing force is exerted on the piston 34, because fluid is permitted to flow around the end disc 64 to engage the piston 34. Coolant passes through the media 22 and enters flow path 46, and then passes between the circumferentially extending wall comprising the centertube 30 and the passages defined between the pleats comprising the array 24 and pass through the stop member 52 and is discharged through outlet opening 18. As the coolant passes through stop member 52, the tip 48 of the rod 40 is exposed to the coolant. Accordingly, as the coolant becomes corrosive, the tip 48 of rod 40 will be eroded away due to the corrosiveness of the coolant. Although it is preferred to provide domains within the rod 40 as discussed above to provide the erodibility of the rod, the material of the stop member 52 could be chosen such that a corrosive couple can be created the rod 40 and the stop member 52, thereby permitting the tip 48 of rod 40 to be eroded in this manner. As the rod erodes, the aforementioned pressure differential acting on piston 34 forces the latter upwardly viewing the FIGURE, thereby forcing the treatment material within the container 32 out of the aperture 38 and deflecting the umbrella valve element 42 to permit the treatment material to enter the coolant passing through flow path 46. As the corrosiveness of the coolant decreases, the rod 40 no longer erodes and accordingly prevents movement of the piston 34, so that the contents of container 32 are no longer forced out of the aperture 38 and the umbrella valve 42 recloses. As the tip 48 erodes, the umbrella valve 42 is held stationary with respect to the rod 40 by the stop member 52 and thus the rod 40 slips within the aperture 38 defined within the umbrella valve element 42, where a friction fit exists between the rod 40 and the umbrella valve 42. As the coolant again becomes corrosive, the tip 48 again begins eroding, causing additional treatment material to be forced from the container 32. Accordingly, it can De seen that as the tip 48 gradually erodes, treatment material is gradually discharged from the container 32 thus controlling the corrosiveness of the coolant within relative narrow limits as compared to prior art devices.

We claim:

1. Device for treating and conditioning engine coolant comprising a housing having an inlet and an outlet, means within said housing for defining a flow path for said coolant between the inlet and the outlet, a container within said housing for storing a quantity of coolant treatment material, valve means for controlling the discharge of said coolant treatment material from said container into said flow path, and corrosiveness responsive means responsive to the corrosiveness of the coolant for discharging said coolant treatment material through said valve means when the corrosiveness of the coolant attains a predetermined level and thereafter permitting said valve means to reclose.

2. Device for treating and conditioning engine coolant as claimed in claim 1, wherein said valve means includes an aperture in said container and a check valve element controlling communication through said aperture to permit communication of said material into said coolant in the flow path but preventing communication from said flow path into said container.

3. Device for treating anti conditioning engine coolant as claimed in claim 2, wherein said corrosiveness responsive means includes a piston movable within said container to force said material through said aperture.

4. Device for treating and conditioning engine coolant as claimed in claim 3, wherein said piston is responsive to the pressure differential of the coolant between the inlet and outlet, said pressure differential moving said piston to discharge said material into said coolant in the flow path.

5. Device for treating and conditioning engine coolant as claimed in claim 3, wherein said corrosiveness responsive means includes a corrodible member opposing movement of the piston, said corrodible member being exposed to said coolant and corroded in response to the corrosiveness of the coolant, said piston moving within said container as said member corrodes to force said material into said flow path.

6. Device for treating and conditioning engine coolant as claimed in claim 5, wherein said corrodible member is a rod, one end of the rod engaging said piston, the other end of said rod engaging a stop member carried by said housing.

7. Device for treating and conditioning engine coolant as claimed in claim 6, wherein said stop member defines a portion of said flow path, said stop member directing said coolant in said flow path to said other end of said rod whereby the corrosiveness of the coolant erodes said one end of the rod to allow said piston to move to force said material into said coolant in said flow path.

8. Device for treating and conditioning engine coolant as claimed in claim 7, wherein said piston defines one end of said container, said rod extending through said container and out of the other end of the container to engage said stop member.

9. Device for treating and conditioning engine coolant as claimed in claim 8, wherein said check valve element is carried on said rod.

10. Device for treating and conditioning engine coolant as claimed in claim 1, wherein said corrosiveness responsive means includes a piston movable within said container to force said material from the housing and a Corrodible member opposing movement of the piston, said Corrodible member being exposed to said coolant and corroded in responsive to the corrosiveness of the coolant, said piston moving within said container as said member corrodes to force said material into said flow path.

11. Device for treating and conditioning engine coolant as claimed in claim 10, wherein one end of the Corrodible member engages said piston, the other end of the corrodible member engaging a stop member carried by the housing.

12. Device for treating and conditioning engine coolant as claimed in claim 11, wherein said stop member defines a portion of said flow path, said stop member directing said coolant in said flow path to said other end of said rod whereby the corrosiveness of the coolant erodes said one end of the rod to allow said piston to move to force said material into said coolant in said flow path.

13. Device for treating and conditioning engine coolant comprising a housing having an inlet and an outlet, means within said housing for defining a flow path for said coolant between the inlet and the outlet, a filtering media within said flow path for filtering said coolant as the coolant passes between the inlet and outlet, a container within said housing for storing a quantity of coolant treatment material, valve means for controlling the discharge of said coolant treatment material from said container into said flow path, and corrosiveness responsive means responsive to the corrosiveness of the coolant for discharging said coolant treatment material through said valve means when the corrosiveness of the coolant attains a predetermined level and thereafter permitting said valve means to reclose.

14. Device for treating and conditioning engine coolant as claimed in claim 13, wherein said filtering media is formed into a circumferentially extending array, said container being mounted within said array.

15. Device for treating and conditioning engine coolant as claimed in claim 14, wherein said array has an inner circumference, said container having a circumferentially extending wall circumscribing said inner circumference.

16. Device for treating anti conditioning engine coolant as claimed in claim 15, wherein said corrosiveness responsive means includes a piston movable within said container to force said material from the housing and a corrodible member opposing movement of the piston, said corrodible member being exposed to said coolant and corroded in responsive to the corrosiveness of the coolant, said piston moving within said container as said member corrodes to force said material into said flow path.

17. Device for treating and conditioning engine coolant as claimed in claim 16, wherein one end of the corrodible member engages said piston, the other end of the corrodible member engaging a stop member carried by the housing.

18. Device for treating and conditioning engine coolant as claimed in claim 17, wherein said stop member defines a portion of said flow path, said stop member directing said coolant in said flow path to said other end of said rod whereby the corrosiveness of the coolant erodes said one end of the rod to allow said piston to move to force said material into said coolant in said flow path.

19. Device for treating and conditioning engine coolant as claimed in claim 13, wherein said corrosiveness responsive means includes a piston movable within said container to force said material from the housing and a corrodible member opposing movement of the piston, said corrodible member being exposed to said coolant and corroded in response to the corrosiveness of the coolant, said piston moving within said container as said member corrodes to force said material into said flow path.

20. Device for treating and conditioning engine coolant as claimed in claim 19, wherein one end of the corrodible member engages said piston, the other end of the corrodible member engaging a stop member carried by the housing.

21. Device for treating and conditioning engine coolant as claimed in claim 20, wherein said stop member defines a portion of said flow path, said stop member directing said coolant in said flow path to said other end of said rod whereby the corrosiveness of the coolant erodes said one end of the rod to allow said piston to move to force said material into said coolant in said flow path.

* * * * *